United States Patent [19]

Garcia et al.

[11] Patent Number: 4,701,435
[45] Date of Patent: Oct. 20, 1987

[54] CATALYST AND METHOD OF PREPARATION FROM A NATURALLY OCCURRING MATERIAL

[75] Inventors: Juan J. Garcia; Roberto E. Galiasso, both of San Antonio de Los Altos; Magdalena M. Ramirez de Agudelo; Luis Rivas, both of Los Teques; Juan Hurtado, Caracas, all of Venezuela

[73] Assignee: Intevep, S.A., Caracas, Venezuela

[21] Appl. No.: 848,682

[22] Filed: Apr. 7, 1986

[51] Int. Cl.$^4$ .................. B01J 21/00; B01J 21/14; B01J 21/16

[52] U.S. Cl. ................... 502/252; 208/109; 208/251 H; 502/251; 502/254; 502/255; 502/256; 502/410

[58] Field of Search ............... 502/251, 252, 254, 255, 502/256, 410

[56] References Cited
U.S. PATENT DOCUMENTS 3,729,429 4/1973 Robson ........................ 502/254
3,852,361 12/1974 Haas et al. .................... 502/252
4,022,810 5/1977 Kobylinski et al. ............ 502/252

*Primary Examiner*—Asok Pal
*Attorney, Agent, or Firm*—Bachman & LaPointe

[57] ABSTRACT

A method for producing a catalyst for use in the hydrotreatment, hydrodemetallization and hydrocracking of heavy hydrocarbon feedstocks containing high metal levels of vanadium, nickel and sulfur comprises the steps of preparing a carrier from a naturally occurring material consisting essentially of magnesium silicate having a sheet-type structure, iron and nickel wherein the carrier is prepared directly from the above naturally occurring material or, in the alternative, it can be prepared from the naturally occurring material in combination with a catalyst component. In the event the carrier for the catalyst is prepared from the above naturally occurring material without the addition of the catalyst component, the carrier can be impregnated with the catalyst component. The resultant catalyst is particularly useful in the treatment of heavy hydrocarbon feedstocks.

38 Claims, 3 Drawing Figures

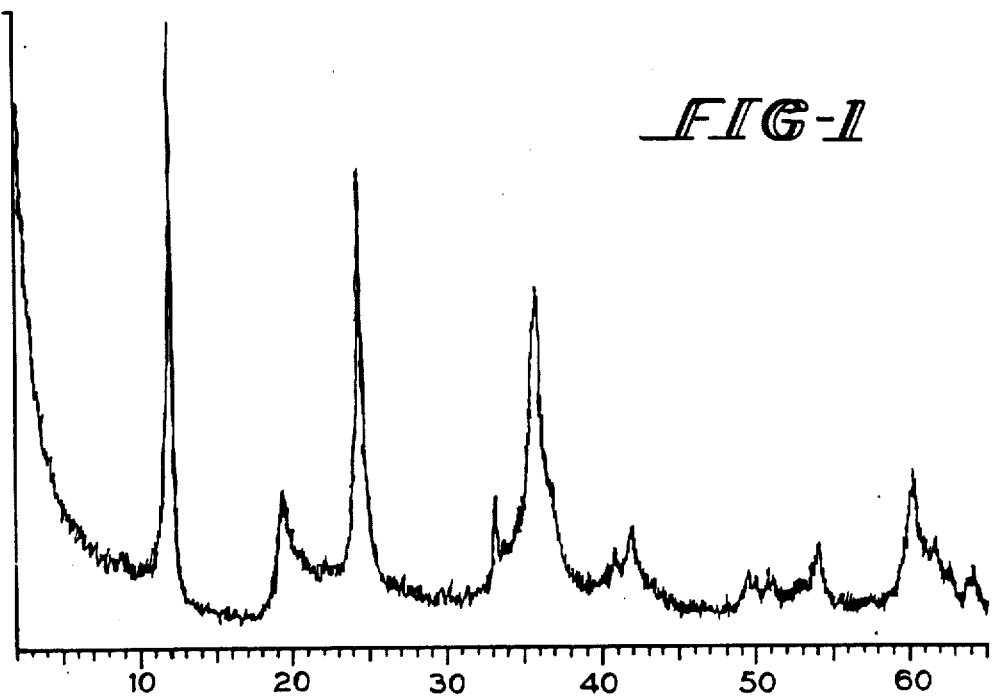
X-RAY DIFFRACTION ANALYSIS OF THE NATURAL OCCURRING MATERIAL OF THE PRESENT INVENTION
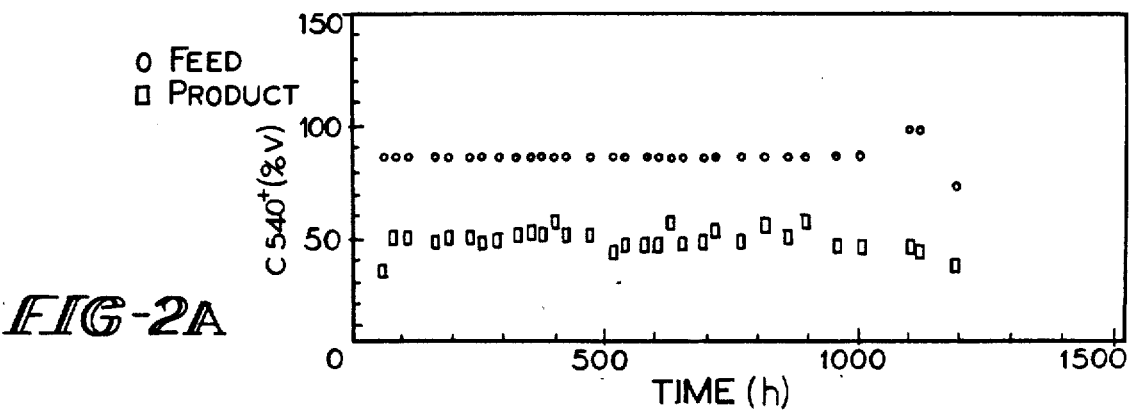
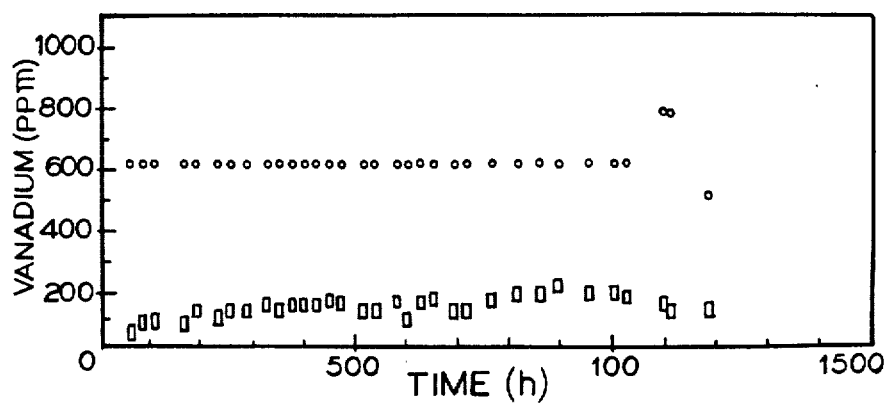
PROPERTIES OF FEED AND PRODUCTS OBTAINED IN EXAMPLE 2

CATALYST AND METHOD OF PREPARATION FROM A NATURALLY OCCURRING MATERIAL

BACKGROUND OF THE INVENTION

The present invention relates to a catalyst for use in the hydrotreatment, hydrodemetallization and hydrocracking of heavy hydrocarbon feedstocks containing high levels of vanadium, nickel and sulfur and a method for the preparation of the catalyst.

Heavy crudes and residuals are generally defined as hydrocarbon feeds which contain high amounts of vanadium, nickel and sulfur. During the hydrotreatment of feedstocks having high concentrations of vanadium and nickel, the catalysts used in the treatment quickly accumulate these metals into their pores thereby resulting in a short catalyst life.

In order to increase the catalyst life the prior art has developed certain hydrotreatment catalysts which have an increased life expectancy. U.S. Pat. Nos. 4,152,250 and 4,196,102 disclose a process for removing metals from hydrocarbons employing clay catalysts of magnesium silicate having a double chain-type structure of the sepiolites type. These particular catalysts exhibit an increase in activity over conventional hydrotreatment catalysts. U.S. Pat. Nos. 3,118,845, 4,152,250, 4,196,102, Japanese Pat. No. 31,878/1974 and British Pat. No. 1,218,080 disclose the addition of a second component to a solid oxide catalyst in order to improve the porosity and activity of the final catalyst. U.S. Pat. Nos. 4,439,312 and 4,367,164 disclose a process and catalysts for treating heavy feedstocks using sepiolites and mixtures thereof with oxide forming substances. While these catalysts exhibit some increase in catalytic activity they still exhibit a short life cycle when treating heavy feedstocks when compared to the treatment of light feedstocks.

Naturally, it would be highly desirable to provide a catalyst and method for making same for hydrotreating, demetallizing and hydrocracking heavy hydrocarbon feedstocks wherein the catalyst is inexpensive to manufacture and exhibits a high accumulation capacity for vanadium, nickel and sulfur.

Accordingly, it is a principal object of the present invention to provide an improved catalyst for use in the hydrotreatment, hydrodemetallization and hydrocracking of heavy hydrocarbon feedstocks.

It is a particular object of the present invention to provide an improved catalyst as aforesaid which is manufactured from a naturally occurring material and thus is inexpensive.

It is a further object of the present invention to provide a method for preparing the catalyst as aforesaid.

Further objects and advantages will appear hereinbelow.

SUMMARY OF THE INVENTION

In accordance with the present invention the foregoing objects and advantages are readily obtained.

The present invention relates to a catalyst for use in the hydrotreatment, hydrodemetallization and hydrocracking of heavy hydrocarbon feedstocks containing high levels of vanadium, nickel and sulfur wherein the catalyst exhibits a high accumulation capacity for vanadium, nickel and sulfur. In addition, the present invention relates to a method for preparing a catalyst as set forth above from a naturally occurring material.

The catalyst of the present invention is prepared from a naturally occurring material consisting essentially of magnesium silicate having a sheet type structure, iron and nickel. In accordance with the present invention the carrier for the catalyst is prepared directly from the naturally occurring material or is prepared from a mixture of the naturally occurring material with a catalytic component. If the carrier is prepared from solely the naturally occurring material then the pre-calcined carrier is impregnated with the catalytic component. The magnesium silicate naturally occurring material belongs to the serpentine group consisting of chrysotile, antigorite, lizardite and mixtures thereof. The naturally occurring material contains the magnesium silicate in the range of about 10 to 90% in terms of the total catalyst weight.

In accordance with a particular feature of the present invention the naturally occurring material can be mixed with an additional element so as to improve the accumulation capacity of the catalyst for vanadium and nickel.

BRIEF DESCRIPTION OF THE DRAWINGS

FIG. 1 is an X-ray diffraction analysis of the naturally occurring material used in the catalyst of the present invention.

FIGS. 2a and 2b are a pair of graphs showing the properties of the feed and products obtained in Example 4.

DETAILED DESCRIPTION

The catalyst of the present invention is prepared from a naturally occurring material consisting essentially of magnesium silicate having a sheet type structure and belonging to the serpentine group consisting of chysotile, antigorite, lizardite and mixtures thereof and iron and nickel. The chrysotile, antigorite, lizardite and mixtures thereof are present in the final catalyst in an amount of about between 10 to 90% by weight in terms of the total catalyst weight and, preferably, in an amount of about between 40 to 90% by weight in terms of the total catalyst weight. As noted above the naturally occurring material used in the preparation of the catalyst of the present invention also contains nickel and iron which may be present in the form of oxides, hydroxides, silicate, aluminates, silica-aluminates or mixtures thereof. In accordance with the present invention the amount of iron as metal in the final catalyst is in an amount of about between 1 to 40% by weight in terms of the total catalyst weight and, preferably, in an amount of about between 5 to 20% by weight in terms of the total catalyst weight. The amount of nickel as metal in the final catalyst is in the amount of about between 0.01 to 40% by weight in terms of the total catalyst weight and, preferably, in an amount of between 0.01 and 5% by weight in terms of the total catalyst weight. The catalyst in accordance with the present invention prepared from a naturally occurring material consisting essentially of magnesium silicate having a sheet-type structure, iron and nickel has the following surface properties.

Surface Area, $m^2/g$: 10–400
Pore Volume, cc/g: 0.2–2.0
Average Pore Diameter (Å): 60 to 600
and a surface chemical composition as measured by XPS of from about
0.01 to 20% iron
0.01 to 10% nickel 0.01 to 50% aluminum
1.0 to 30% magnesium
0.1 to 40% silicon
and preferably
5 to 20% iron
0.01 to 5% nickel
0.01 to 50% aluminum
1.0 to 30% magnesium
0.1 to 40% silicon The carrier for the catalyst of the present invention is prepared directly from the above-identified naturally occurring material or, in the alternative, can be prepared from the naturally occurring material in combination with a catalytic component selected from the group consisting of molybdenum, cobalt, nickel, iron, tungsten, copper, vanadium, chromium and mixtures thereof. In the event the carrier for the catalyst of the present invention is prepared from the above naturally occurring material without the addition of the catalytic component, the carrier can be impregnated with the catalytic component selected from the groups set forth above. In accordance with the present invention the catalytic component is present as an elemental metal in the final catalyst in an amount of about between 0.1 to 40% by weight in terms of the total catalyst weight.

Prior to preparation of the carrier for the catalyst of the present invention as set forth above, the naturally occurring material may be mixed with a further element selected from the group consisting of aluminum, silicon, titanium, magnesium and mixtures thereof. The carrier of the catalyst of the present invention is prepared by drying, grinding and sieving the naturally occurring material to particles with a size of less than 500 microns. The selected particles can be directly molded or they can be mixed with a catalytic component selected from the groups set forth above and/or a further element as previously noted. Techniques for molding the carrier are conventional. The molded carrier is then dried and precalcined so as to produce oxide products of the further element noted above which is selected from the group consisting of aluminum, silicon, titanium, magnesium and mixtures thereof. The precalcining of the carrier produces an oxide substance of the further element, the oxide substance being selected from the group consisting of alumina boehmite, pseudoboehmite, gibbsite, aluminum salts, silica-alumina, titanium oxide, titanium salts, magnesium oxide, magnesium salts, hydrosols or hydrogels of silicon, magnesium, titanium, aluminum and mixtures thereof. The amount of the oxide substance is in the range of about between 0 to 80 wt.% in terms of total catalyst weight. After precalcining, in the event the carrier was prepared from the naturally occurring material without the catalytic component, the molded and precalcined carrier is impregnated with the catalytic component and dried and calcined. In accordance with the present invention the temperature for precalcinating is between 100° to 800° C. Prior to treating a heavy hydrocarbon feedstock with the catalyst of the present invention the catalyst is subjected to presulphiding with hydrogen sulphide at a temperature of between 200° and 500° C. wherein the amount of sulphur in the final catalyst is about between 0.1 to 15 wt.% in terms of total catalyst weight.

In accordance with a further feature of the catalyst of the present invention, a promoter element selected from the group consisting of chlorine, fluorine, lithium, boron, phosphorus, cobalt nickel, iron tungsten, copper, vanadium, chromium, molybdenum and mixtures thereof may be incorporated in the final catalyst as an elemental element in an amount of about between 0.05 to 40% by weight in terms of total catalyst weight. In addition, the catalyst can be treated with an element selected from the group consisting of lithium, ammonium and mixtures thereof to modify the composition of the final catalyst.

The advantages of the catalyst of the present invention will be made clear from the following examples.

EXAMPLE 1

Two catalysts of the present invention were prepared from a naturally occurring material having the chemical composition set forth in Table 1.

TABLE 1

| CHEMICAL COMPOSITION OF THE NATURAL OCCURRING MINERAL | | |
|---|---|---|
| Aluminum | (calculated as $Al_2O_3$) | 1.1% |
| Iron | (calculated as $Fe_2O_3$) | 19.8% |
| Silicon | (calculated as $SiO_2$) | 32.2% |
| Magnesium | (calculated as MgO) | 27.7% |
| Nickel | (calculated as NiO) | 1.9% |

Catalyst I was prepared by drying and grinding the naturally occurring material set forth in Table 1 to a particular size of below 100 microns which were then mixed with distilled water in a paddle type agitator. The slurry was filtered and the resultant cake was extruded into 1/16" extrudates which were dried at room temperature for 6 hours and thereafter at 100° C. for 2 hours. The dried material was pre-calcined at a temperature of 460° C. for 2 hours wherein the temperature was increased at a rate of 4° C. per minute. The resulting catalyst support was impregnated with an aqueous solution containing molybdenum so as to deposit 5% by weight molybdenum in terms of the final catalyst weight on the catalyst support. The impregnated support was thereafter dried at room temperature for 8 hours and thereafter at 100° C. for 2 hours. The dried catalyst was thereafter calcined at a temperature of 460° C. for 2 hours wherein the temperature was increased at a heating rate of 4° C. per minute.

Catalyst II was prepared from the same 100 micron sized naturally occurring particles described above with regard to Catalyst I. The naturally occurring material in the amount of 1000 grams was mixed with 1000 grams of pseudoboehmite and water in a paddle type agitator. The slurry was filtered and the resultant cake was extruded into 1/16" extrudates. The extrudates were dried first at room temperature for 6 hours and thereafter at 100° C. for 2 hours. The dried material was pre-calcined, impregnated and finally calcined in the same manner set forth above with respect to Catalyst I.

Table 2 shows the physical and chemical properties of the catalysts of the present invention (Catalysts I and II) and that of two conventional catalysts, Catalyst III being a cobalt, molybdenum/alumina catalyst and Catalyst IV being a molybdenum/sepiolite catalyst prepared in accordance with the procedure disclosed in U.S. Pat. No. 4,439,312. It should be noted that the molybdenum concentration is substantially the same in all four catalysts.

TABLE 2

| CATALYST PROPERTIES | | | | |
|---|---|---|---|---|
| Properties | I | II | III | IV |
| Surface area (m²/g) | 120 | 160 | 170 | 140 |
| Pore Volume (cc/g) | 0.46 | 0.65 | 0.64 | 0.75 |

TABLE 2-continued

| CATALYST PROPERTIES | | | | |
|---|---|---|---|---|
| Properties | I | II | III | IV |
| less than 100 Å (diam) | 0.02 | 0.05 | 0.17 | 0.10 |
| 100–200 Å (diam) | 0.10 | 0.15 | 0.31 | 0.24 |
| 200–500 Å (diam) | 0.30 | 0.40 | 0.11 | 0.37 |
| 500 Å or above (diam) | 0.04 | 0.05 | 0.05 | 0.04 |
| Average Pore Diameter (Å) | 153 | 163 | 151 | 214 |
| Mo (%) | 4.9 | 4.9 | 5.0 | 4.9 |
| Co (%) | — | — | 2.1 | — |
| Alumina (%) | 0.5 | 42 | bal. | — |
| Sepiolite | — | — | — | bal. |

Tests on the catalytic activity of the aforementioned catalysts were carried out using Tia Juana residuum having the properties shown in Table 3.

TABLE 3

| FEED PROPERTIES | |
|---|---|
| Properties | Tia Juana |
| API | 4.5 |
| Sulphur % wt. | 3.40 |
| Vanadium ppm | 700 |
| Conradson Carbon % wt. | 25.0 |
| Viscosity cst (210° F.) | 9000 |
| 540° C.+ % V | 90 |

All the catalysts were pre-sulphided at 360° C. for 4 hours with a mixture of hydrogen sulphide and hydrogen before starting the reaction tests. The reaction tests were performed using a fixed bed reactor system loaded with 100 cc of catalyst. The reaction conditions are set forth in Table 4.

TABLE 4

| REACTION CONDITIONS | |
|---|---|
| Reaction Temperature (°C.) | 415 |
| Reaction pressure (atm.) | 140 |
| Hydrogen/feed ratio (N L/L) | 1000 |
| LHSV (H$^{-1}$) | 0.5 |

After 100 hours of operation the reaction products were taken for analysis and the results are set forth in Table 5.

TABLE 5

| CATALYTIC TEST RESULTS | | | | |
|---|---|---|---|---|
| Conversion % wt. | I | II | III | IV |
| Hydrodesulfurization | 68 | 75 | 75 | 52 |
| Hydrodemetallization | 60 | 71 | 50 | 43 |
| Conradson Carbon | 34 | 41 | 30 | 30 |
| Asphaltenes | 30 | 36 | 25 | 27 |
| Fraction 540° C.+ % V | 42 | 47 | 29 | 31 |

The results of the activity tests show the Catalysts I and II present higher activites than Catalyst IV (the molybdenum/sepiolite catalyst of U.S. Pat. No. 4,439,312). Also, the conversion of Conradson Carbon, asphaltenes and the 500° C.+ fraction is higher when employing Catalysts I and II than when employing the conventional cobalt molybdenum/alumina catalyst (Catalyst III). Thus, from the foregoing it is clear that the catalysts of the present invention offer superior results over known prior art catalysts.

EXAMPLE 2

In order to test the catalyst stability of the catalyst of the present invention, Catalyst II was tested in a longer term operation. The test was performed using the heavy Tia Juana residuum set forth in Table 3. The reaction conditions were the same as those set forth in Table 4.

FIGS. 2A and 2B show the stability characteristics of the catalyst during a 1000 hour run at the above-noted hydrocracking conditions.

EXAMPLE 3

Catalyst I and Catalyst III were used to hydrotreat the heavy Cerro Negro and Urdaneta feeds set forth in Table 6. The required conditions were the same as set forth in Table 4 above.

TABLE 6

| Properties | Cerro Negro | Urdaneta |
|---|---|---|
| API | 5.4 | 5.9 |
| Sulphur % wt. | 3.90 | 3.75 |
| Vanadium ppm | 516 | 640 |
| Conradson Carbon % wt. | 17.0 | 14.7 |
| Viscosity cst (210° F.) | 6000 | 4790 |
| 540° C.+ % V | 61 | 65 |

The conversion values obtained for Catalysts I and III when treating the feeds set forth in Table 6 are shown in Table 7.

TABLE 7

| | CERRO NEGRO Catalyst | | URDANETA Catalyst | |
|---|---|---|---|---|
| Conversion | I | III | I | III |
| Hydrodesulfurization | 70 | 75 | 68 | 75 |
| Hydrodemetallization | 70 | 54 | 64 | 52 |
| Asphaltenes | 38 | 27 | 32 | 25 |
| Fraction 540° C.+ % V | 46 | 30 | 43 | 29 |

Again, it can be seen, that the hydrodemetallization, asphaltene conversion and 540° C.+ fraction conversion is superior with Catalyst I, the catalyst of the present invention, as compared to conventional Catalyst III.

It can be seen from the foregoing that the catalysts of the present invention produced by the process of the present invention offer an attractive alternative to conventional catalysts when used in the treatment of heavy hydrocarbon feeds characterized by elevated concentrations of metals.

This invention may be embodied in other forms or carried out in other ways without departing from the spirit or essential characteristics thereof. The present embodiment is therefore to be consideed as in all respects illustrative and not restrictive, the scope of the invention being indicated by the appended claims, and all changes which come within the meaning and range of equivalency are intended to be embraced therein.

What is claimed is:

1. A method for producing a catalyst for use in the hydrotreatment, hydrodemetallization and hydrocracking of heavy hydrocarbon feedstocks containing high metal levels of vanadium, nickel and sulfur comprising preparing a carrier by mixing a naturally occurring material consisting essentially of about 10 to 90% by weight magnesium silicate having a sheet-type structure, about 1.0 to 40% by weight iron and about 0.01 to 40% by weight nickel in the naturally occurring material with a catalyst component selected from the group consisting of molybdenum, cobalt, nickel, iron, tungsten copper, vanadium, chromium and mixtures thereof.

2. A method for producing a catalyst for use in the hydrotreatment, hydrodemetallization and hydrocracking of heavy hydrocarbon feedstocks containing high metal levels of vanadium, nickel and sulfur comprising the steps of providing a carrier from a naturally occurring material consisting essentially of about 10 to 90% by weight magnesium silicate having a sheet-type structure, about 1.0 to 40% by weight iron and about 0.01 to 40% by weight nickel in the chrysatile structure and impregnating said carrier with a catalytic component selected from the group consisting of molybdenum, cobalt, nickel, iron, tungsten, copper, vanadium, chromium and mixtures thereof.

3. A method according to claim 1 including mixing said naturally occurring material with a further element selected from the group consisting of aluminum, silicon, titanium, magnesium and mixtures thereof prior to preparing said carrier.

4. A method according to claim 2 including mixing said naturally occurring material with a further element selected from the group consisting of aluminum, silicon, titanium, magnesium and mixtures thereof prior to preparing said carrier.

5. A method according to claim 3 including pre-calcining said carrier so as to produce an oxide substance of said further element selected from the group consisting of alumina boehmite, pseudoboehmite, gibbsite, aluminum salts, silica-alumina, titanium oxide, titanium salts, magnesium oxide, magnesium salts, hydrosols or hydrogels of silicon, magnesium, titanium, aluminum and mixtures thereof.

6. A method according to claim 4 including pre-calcining said carrier so as to produce an oxide substance of said further element selected from the group consisting of alumina boehmite, pseudoboehmite, gibbsite, aluminum salts, silica-alumina, titanium oxide, titanium salts, magnesium oxide, magnesium salts, hydrosols or hydrogels of silicon, magnesium, titanium, aluminum and mixtures thereof.

7. A method according to claim 1 wherein said magnesium silicate belongs to the serpentine group consisting of chrysotile, antigorite, lizardite and mixtures thereof.

8. A method according to claim 2 wherein said magnesium silicate belongs to the serpentine group consisting of chrysotile, antigorite, lizardite and mixtures thereof.

9. A method according to claim 7 wherein said naturally occurring material contains magnesium silicate in the range of about 10 to 90% by weight in terms of the total catalyst weight.

10. A method according to claim 8 wherein said naturally occurring material contains magnesium silicate in the range of about 10 to 90% by weight in terms of the total catalyst weight.

11. A method according to claim 5 wherein the temperature for pre-calcination is between 100° and 800° C.

12. A method according to claim 6 wherein the temperature for pre-calcination is between 100° and 800° C.

13. A method according to claim 1 wherein the amount of said serpentine group elements are present in the final catalyst in an amount in the range of about 10 to 90% by weight in terms of the total catalyst weight.

14. A method according to claim 1 wherein the amount of said serpentine group elements are present in the final catalyst in an amount in the range of about 10 to 90% by weight in terms of the total catalysts weight.

15. A method according to claim 5 wherein the amount of said oxide substance is in the range of about between 0 to 80 wt.% in terms of total catalyst weight.

16. A method according to claim 6 wherein the amount of said oxide substance is in the range of about between 0 to 80 wt.% in terms of total catalyst weight.

17. A method according to claim 1 including providing a promoter element selected from the group consisting of chlorine, fluorine, lithium, boron, phosphorus, cobalt nickel, iron tungsten, copper, vanadium, chromium, molybdenum and mixtures thereof.

18. A method according to claim 2 including providing a promoter element selected from the group consisting of chlorine, fluorine, lithium, boron, phosphorus, cobalt nickel, iron tunsten, copper, vanadium, chromium, molybdenum and mixtures thereof.

19. A method according to claim 17 wherein said promotor element is present in an amount of about between 0.05 to 40 wt.% in terms of total catalyst weight.

20. A method according to claim 18 wherein said promotor element is present in an amount of about between 0.05 to 40 wt.% in terms of total catalyst weight.

21. A method according to claim 1 further including pre-sulphiding said catalyst prior to treating a heavy hydrocarbon feedstock with hydrogen sulphide at a temperature of between 200° and 500° C. wherein the amount of sulphur in the final catalyst is about between 0.1 to 15 wt.% in terms of total catalyst weight.

22. A method according to claim 2 further including pre-sulphiding said catalyst prior to treating a heavy hydrocarbon feedstock with hydrogen sulphite at a temperature of between 200° and 500° C. wherein the amount of sulphur in the final catalyst is about between 0.1 to 15 wt.% in terms of total catalyst weight.

23. A method according to claim 1 further including treating said catalyst with an element selected from the group consisting of lithium, ammonium and mixtures thereof to modify the composition of the catalyst.

24. A method according to claim 2 further including treating said catalyst with an element selected from the group consisting of lithium, ammonium and mixtures thereof to modify the composition of the catalyst.

25. A method according to claim 1 wherein the amount of said catalytic component is in the range of about between 0.1 to 40 wt.% in terms of total catalyst weight.

26. A method according to claim 2 wherein the amount of said catalytic component is in the range of about between 0.1 to 40 wt.% in terms of total catalyst weight.

27. A method according to claim 1 wherein said naturally occurring material contains magnesium silicate in the range of about 40 to 90% by weight in terms of the total catalyst weight.

28. A method according to claim 1 wherein said naturally occurring material contains magnesium silicate in the range of about 40 to 90% by weight in terms of the total catalyst weight.

29. A method according to claim 9 wherein said naturally occurring material contains magnesium silicate in the range of about 40 to 90% by weight in terms of the total catalyst weight.

30. A method according to claim 10 wherein said naturally occurring material contains magnesium silicate in the range of about 40 to 90% by weight in terms of the total catalyst weight.

31. A method according to claim 1 wherein said naturally occurring material contains nickel in the range of about between 0.01 to 5 wt.% in terms of total catalyst weight.

32. A method according to claim 1 wherein said naturally occurring material contains nickel in the range of about between 0.01 to 5 wt.% in terms of total catalyst weight.

33. A method according to claim 1 wherein said naturally occurring material contains iron in the range of about between 5 to 20 wt.% in terms of total catalyst weight.

34. A method according to claim 1 wherein said naturally occurring material contains iron in the range of about between 5 to 20 wt.% in terms of total catalyst weight.

35. A catalyst for use in the hydrotreatment, hydrodemetallization and hydrocracking of heavy hydrocarbon feedstocks containing high metal levels of vanadium, nickel and sulfur, said catalyst prepared from a naturally occurring material consisting essentially of about 10 to 90% by weight magnesium silicate having a sheet-type structure, about 1.0 to 40% by weight iron and about 0.01 to 40% by weight nickel in the naturally occuring material, said catalyst having the following properties
Surface Area, m$^2$/g: 10–400
Pore Volume, cc/g: 0.2–2.0
Average Pore Diameter (A): 60 to 600
and a surface chemical composition as measured by XPS of from about
0.01 to 20% iron
0.01 to 10% nickel
0.01 to 50% aluminum
1.0 to 30% magnesium
0.01 to 40% silicon.

36. A catalyst according to claim 35 wherein the surface chemical composition as measured by XPS is from about 0.01 to 5% aluminum and 0.01 to 40% silicon.

37. A catalyst according to claim 35 wherein said catalyst is prepared from a naturally occurring material consisting essentially of magnesium silicate having a sheet-type structure, iron and nickel wherein said magnesium silicate belongs to the serpentine group consisting of chrysotile, antigorite, lizardite and mixtures thereof.

38. A catalyst according to claim 35 wherein the surface chemical composition as measured by XPS is from about
5 to 20% iron
0.01 to 5% nickel
0.01 to 50% aluminum
1.0 to 30% magnesium
0.1 to 40% silicon.

* * * * *

UNITED STATES PATENT AND TRADEMARK OFFICE
CERTIFICATE OF CORRECTION

PATENT NO. : 4,701,435
DATED : October 20, 1987
INVENTOR(S) : Juan J. Garcia et al.

It is certified that error appears in the above-identified patent and that said Letters Patent is hereby corrected as shown below:

Column 6, claim 1, line 60, change "catalyst" to read --catalytic--.

Column 7, claim 14, line 62, change "catalysts" to read --catalyst--.

Column 8, claim 18, line 9, change "tunsten" to read --tungsten--.

Column 8, claim 22, line 27, change "sulphite" to read --sulphide--.

Column 9, claim 35, line 23, change "(A)" to read --($\mathring{A}$)--.

Column 10, claim 35, line 5, change "0.01" to read --0.1--.

Column 10, claim 36, line 8, change "0.01" to read --0.1--, second occurrence.

Signed and Sealed this

Twenty-first Day of June, 1988

Attest:

DONALD J. QUIGG

*Attesting Officer*   *Commissioner of Patents and Trademarks*